Feb. 5, 1957 H. A. PURSCHE 2,780,158
TWO WAY DISC PLOUGH
Filed Dec. 12, 1952 4 Sheets-Sheet 1
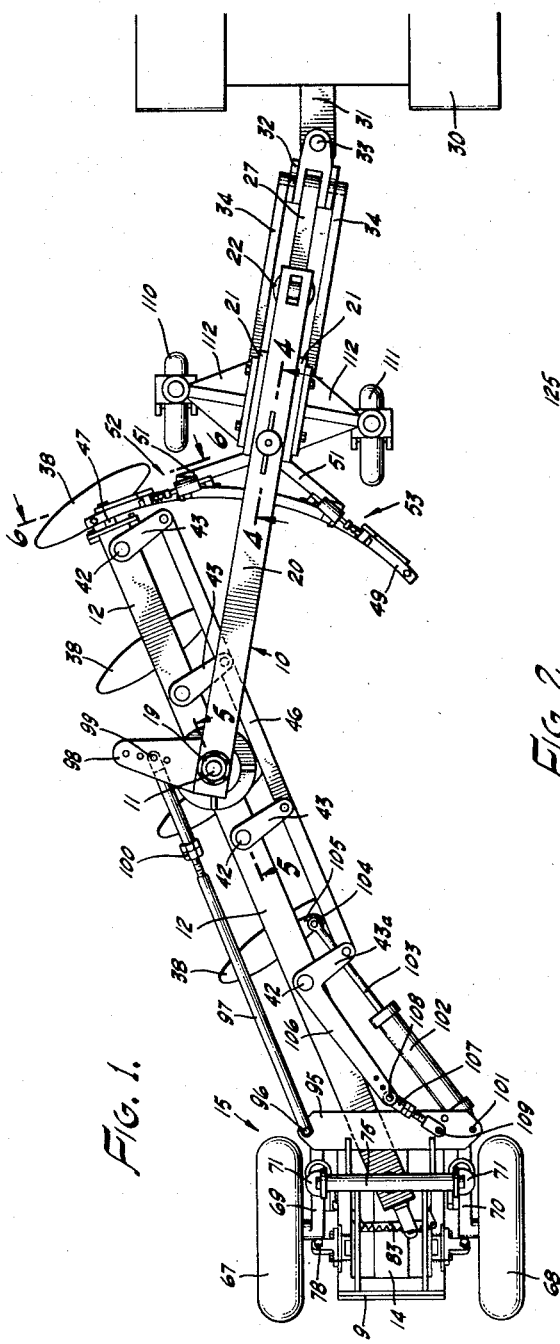
INVENTOR.
HARRY A. PURSCHE
BY
ATTORNEYS Feb. 5, 1957  H. A. PURSCHE  2,780,158
TWO WAY DISC PLOUGH
Filed Dec. 12, 1952  4 Sheets-Sheet 2
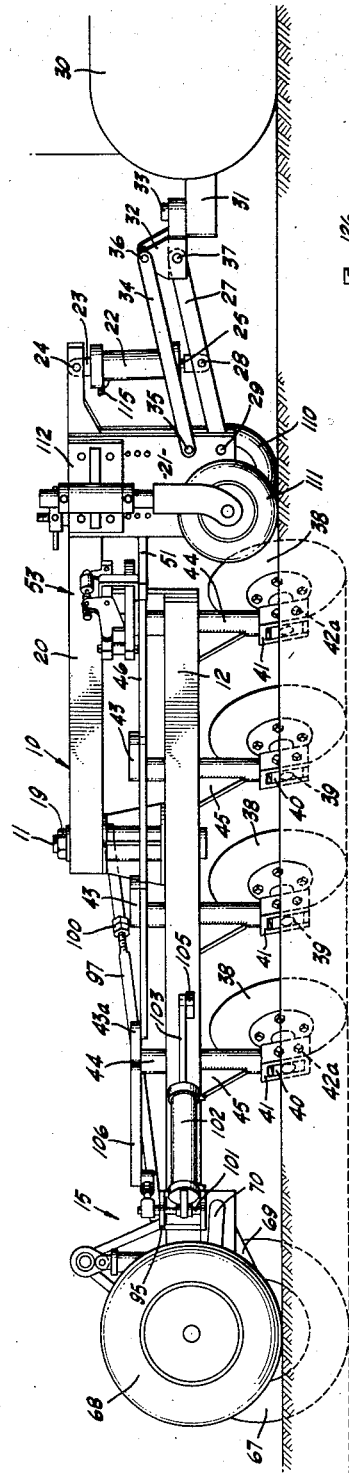
INVENTOR.
HARRY A. PURSCHE
BY
ATTORNEYS Feb. 5, 1957 H. A. PURSCHE 2,780,158
TWO WAY DISC PLOUGH
Filed Dec. 12, 1952 4 Sheets-Sheet 3

INVENTOR.
HARRY A. PURSCHE
BY Lyon & Lyon
ATTORNEYS

Feb. 5, 1957 H. A. PURSCHE 2,780,158
TWO WAY DISC PLOUGH
Filed Dec. 12, 1952 4 Sheets-Sheet 4

INVENTOR.
HARRY A. PURSCHE
BY Lyon & Lyon
ATTORNEYS

United States Patent Office 2,780,158
Patented Feb. 5, 1957

2,780,158

TWO WAY DISC PLOUGH

Harry A. Pursche, Gardena, Calif.

Application December 12, 1952, Serial No. 325,544

13 Claims. (Cl. 97—31)

This invention relates to agricultural implements, and is particularly directed to improvements in two way disc ploughs. Two way ploughs are widely used on irrigated land where it is necessary or desirable to keep the land flat. Such ploughs produce either a right-hand furrow or a left-hand furrow, as desired; and therefore the plough can be drawn back and forth across a field, instead of ploughing around the field in the conventional manner. Disc ploughs have certain advantages over mold board ploughs, and one of these advantages is that less power is required to produce a furrow of the same depth with a disc plough. Furthermore, in certain types of rocky soil, disc ploughs give superior performance.

Two way disc ploughs in heavy duty sizes have not always been satisfactory because of the well known tendency of the rear portion of the plough to swing laterally to one side. This undesirable action is known in the art as "sallying." The larger the plough, and the more discs which it employs, the greater is the lateral side thrust; and hence few large size, heavy duty, two way disc ploughs have been used commercially because of inability to prevent "sallying."

In accordance with my invention, I provide a weighted carriage for the rear end of a two way disc plough, and provide means whereby side supporting wheels on said carriage alternately roll in the furrow while the other wheel rolls on unploughed ground. Such a device effectively prevents lateral shifting of the rear end of the plough. The plough carrier with its gang of plough discs is positioned forwardly of the wheeled carriage and to the rear of the towing vehicle. The carriage and plough discs can be raised and lowered when desired, and can be shifted to produce either a right-hand or a left-hand furrow.

From this preliminary description it will be understood that the principal object of my invention is to provide an improved form of two way disc plough which is well suited for heavy duty deep ploughing, and in which lateral shifting of the rear end of the plough is minimized.

Another object is to provide a two way disc plough of this type and having a plough carrier mounted to swing about a substantially vertical axis for shifting the position of the carrier.

Another object is to provide a device of this type in which the carrier is positioned between the tractor and a wheeled carriage.

Another object is to provide such a device in which a carrier and plough disc can be raised clear of the ground for highway transportation.

The more detailed objects and advantages will appear hereinafter.

In the drawings,

Figure 1 is a plan view showing a preferred embodiment of my invention;

Figure 2 is a side elevation thereof, the carrier and plough discs being shown in raised position;

Figure 3 is a side elevation showing the parts in ploughing position;

Figure 4 is a sectional detail taken substantially on the lines 4—4, as shown in Figure 1;

Figure 5 is a sectional elevation, partly broken away, taken substantially on the lines 5—5, as shown in Figure 1;

Figure 6 is a fragmental elevation taken in the direction of the lines 6—6, as shown in Figure 1;

Figure 11:
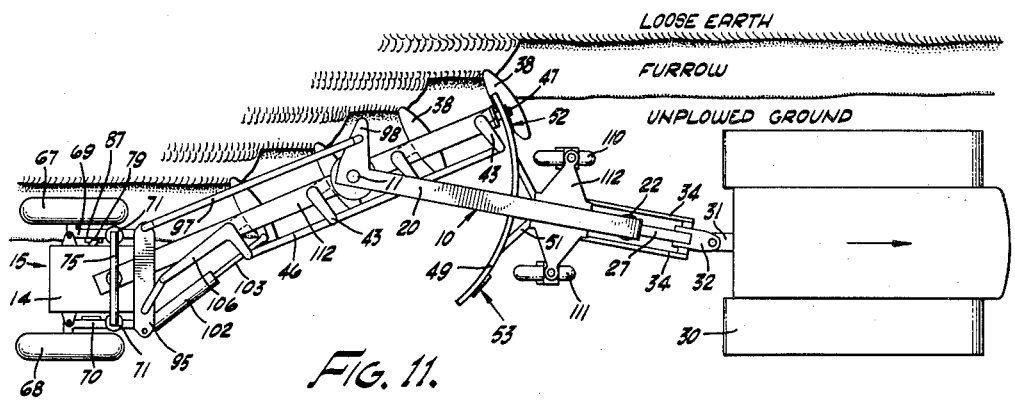
Figure 12:
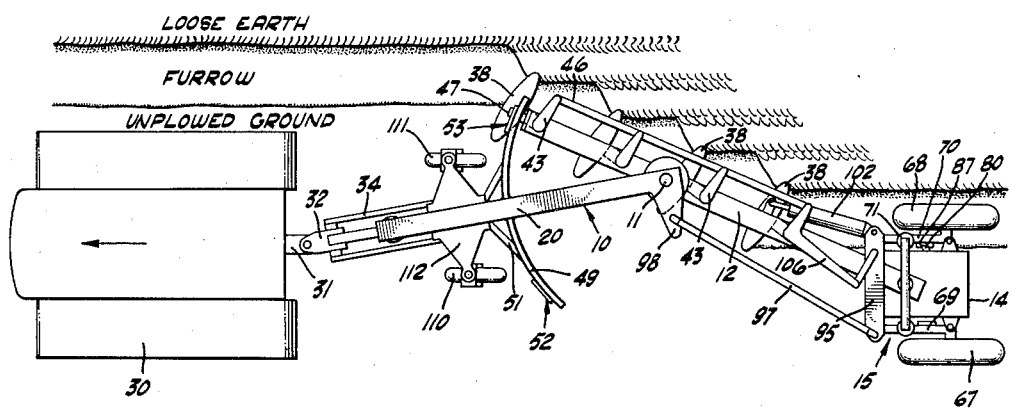
Figure 13:
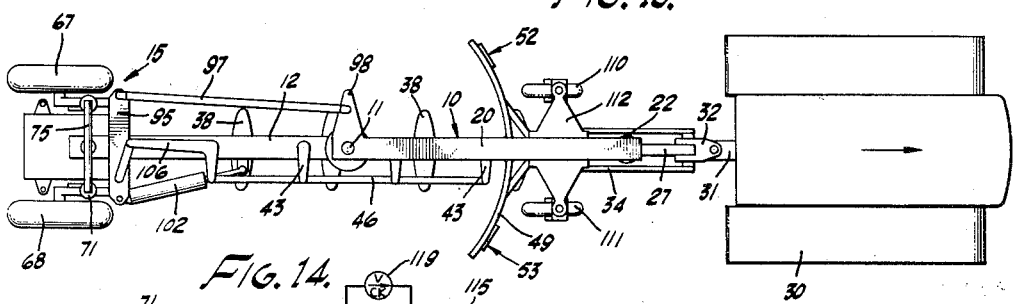

Figures 11, 12, and 13 are schematic plan views showing operation of the device. Figure 11 shows the device cutting a left-hand furrow, and Figure 12 a right-hand furrow. Figure 13 shows the device in position for highway transportation.

Figure 14:
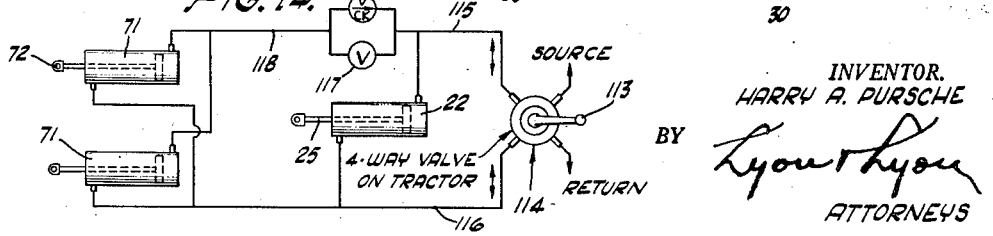

Figure 14 is a schematic diagram showing certain hydraulic connections.

Referring to the drawings, the frame generally designated 10 is pivotally connected at 11 to the plough carrier 12. This carrier 12 takes the form of an elongated beam, pivoted at 13 to the frame 14 of the wheeled carriage generally designated 15. If desired, metal weights 9 may be secured to the frame 14 to stabilize the wheeled carriage 15. The pivot connection 11 may include a spacer sleeve 16 having a pivot shaft 17 extending vertically therethrough. A washer 18 is positioned between the nut 19 and the swinging beam 20 of the frame 10.

At its forward end the beam 20 passes between side plates 21, and is connected to an upright power cylinder assembly 22. A trunnion 23, at the upper end of the assembly 22, is connected to the beam 20 at 24. A piston rod 25 projects from the lower end of the assembly 22, and carries a clevis 26 which is pivoted to the beam 27 by means of the pivot pin 28. The beam 27 extends between the side plates 21, and is pivotally connected to them by means of the pivot pin 29. The plates 21 are fixed to the beam 20 by any suitable means, for example, by welding.

The tractor 30 is provided with the usual draft bar 31. A draft fitting 32 is pivotally connected to the bar 31 by means of draft pin 33. The fitting 33 can, therefore, swivel about a vertical axis with respect to the draft bar 31. Parallel links 34 are each pivotally connected to the side plates 21 at pivot pins 35, and are pivotally connected to the fitting 32 at pivot pins 36. The beam 27 is pivotally connected to the fitting 32 at 37.

From this description it will be understood that the beam 27 and links 34 function as a parallelogram, so that the pivot pins 35 are always contained in a vertical plane passing through the axis of the pivot pin 29. When the power cylinder assembly 22 is extended, the frame 10 is raised; and, when the pressure within the upper end of the assembly 22 is vented and the lower end pressurized, the frame descends to plowing position.

A plurality of ground-engaging plough discs 38 are mounted on the carrier 12 in uniformly spaced relationship. Each of the discs 38 is provided with an integral axle 39 which rotates in a bearing box 40. Each box 40 is adjustably received within a housing 41 fixed on the lower end of a pivot shaft 42. The angular position of each bearing box 40 is adjustably fixed by means of the threaded elements 42ᵃ. The upper end of each pivot shaft 42 is joined to a crank arm 43 by any convenient means, for example, by welding. Each pivot shaft 42 passes through a bearing sleeve 44 fixed on the carrier 12 and braced by means of gussets 45.

As shown in Figure 1, the crank arms 43 and the rear crank arm 43ᵃ are each pivoted to a common shifting bar 46. The result is that the plough discs 38 can be turned as a gang by moving the shifting bar 46. As pointed out below, the shifting of the discs 38 is made dependent upon the swinging movement of the carrier 12 relative to the carriage 14.

The forward end of the carrier 12 is provided with a roller 47 which travels in a guide slot 48 between spaced arcuate members 49 and 50. These members 49 and 50 are fixed to the beam 20 and constitute a part of the frame 10. Angular braces 51 may be provided between the members 49 and 50 and the side plates 21 to contribute stiffness. Latch assemblies generally designated 52 and 53 are adjustably mounted near the opposed ends of the arcuate member 49. As shown in Figure 6, the latch assembly 52 includes a power cylinder assembly 54 pivotally mounted at 55 on the support bracket 56. This bracket is carried on the upper member 49. Stops 57 are mounted on the projecting piston rod 58, and a compression spring 59 engages one of these stops and the centrally positioned lug 60 on the latch 61. The other stop 57 engages the lug 60 when the piston rod 58 is retracted. The latch 61 is connected to the member 49 by means of the pivot pin 62. A shoulder 63 on the latch is positioned to engage the projecting roller 47 on the carrier 12. The roller 47 is carried on an end bracket 64 fixed to the forward end of the carrier 12 by means of threaded fastenings 65. When the power cylinder assembly 54 is actuated to advance the piston rod 58, the latch 61 is moved by the spring 59 to the operative position shown in Figure 6. When the piston rod 58 is retracted, the latch 61 is swung to the inoperative dotted line position.

The latch 61 is provided with a sloping surface 66 which may be engaged by the roller 47 as it swings from left to right, as viewed in Figure 6. The spring 59 allows the latch 61 to turn in a counterclockwise direction, and thereby permits the roller 47 to reach the end of its travel in the slot 48 between the members 49 and 50.

It will be understood that the latch assembly 53 is substantially the same as the latch assembly 52 just described, with the exception that it is reversed, end for end. The purpose of these latch assemblies is to hold the plough carrier 12 in one of two selected positions, so that a right-hand furrow or a left-hand furrow may be produced as desired.

Figure 7:
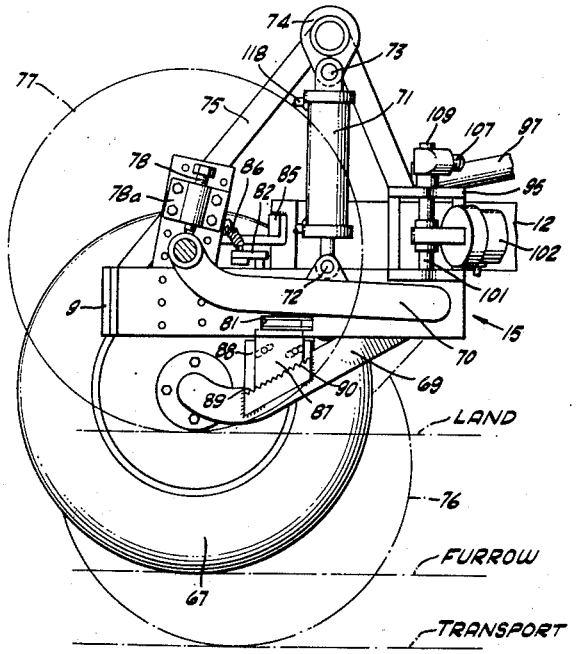
Figure 7 is a side elevation, partly in section and partly broken away, showing details of the wheeled carriage.
Figure 9:
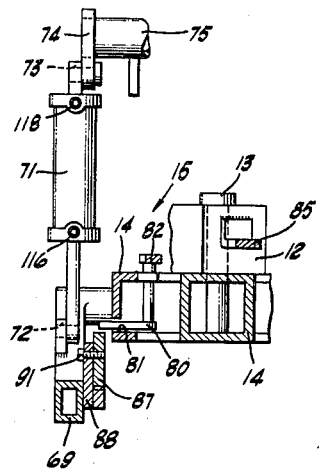
Figure 9 is a sectional elevation showing certain details of construction of the wheeled carriage.

The wheeled carriage 15 has a pair of ground-contacting wheels 67 and 68, each mounted to rotate on the swinging end of a swinging arm 69, 70. Each of these arms is pivotally mounted on the frame 14 near the forward end thereof. Power means are provided for swinging the arms about their respective pivotal supports; and, as shown in the drawings, this power means includes a pair of upright power cylinder assemblies 71. Each of these assemblies 71 is pivoted at 72 to one of the arms, and is pivoted at 73 to a stationary element 74 mounted on an A frame 75. This A frame 75 is fixed to the frame 14. The power cylinder assemblies 71 are hydraulically connected for actuation in unison. When the assemblies 71 are fully extended, the wheels 67 and 68 take the position shown by the dotted line 76 in Figure 7. Similarly, when the assemblies 71 are fully retracted, the wheels 67 and 68 take the position shown by the dotted line 77. Set screws 78 mounted on adjustable brackets 78ᵃ engage the outer ends of the wheel arms to limit upward movement of each wheel relative to the frame 14.

Figure 8:
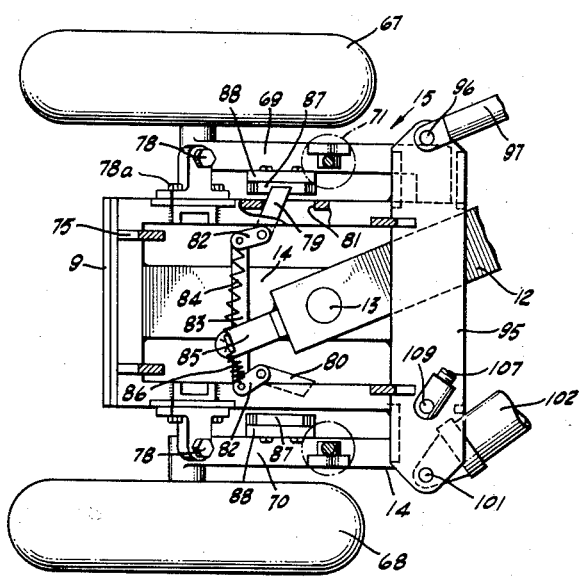
Figure 8 is a plan view, partly in section, of the wheeled carriage.
Figure 10:
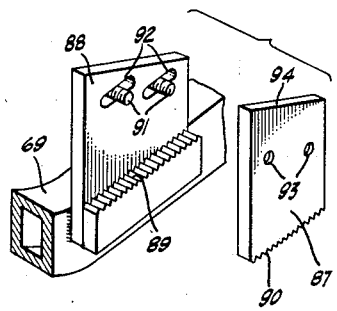
Figure 10 is a perspective view, on an enlarged scale, showing details of the mechanism for adjusting the position of a stop on wheel arms for minimizing transverse tilt of the carriage.

It is desired to have one of the wheels roll in a right-hand furrow and have the other wheel roll in a left-hand furrow. The wheel 67 is laterally positioned to roll in a left-hand furrow cut by the rearmost plough disc 38 when it is shifted to cut a left-hand furrow. Similarly, the wheel 68 is laterally positioned to roll in a right-hand furrow cut by the same plough disc 38 when it is shifted to the position to produce a right-hand furrow. When one of the wheels rolls in the furrow, the other rolls on unploughed ground. Means are provided, minimizing transverse tilt of the wheel carriage 15, so that its frame 14 remains substantially level during ploughing operations. As shown in the drawings, this means includes a pair of laterally projecting pivoted stop elements 79 and 80 which project through apertures 81 provided in the frame 14. As shown in Figure 8, these swinging stop elements 79 and 80 are each provided with a crank 82, and the cranks 82 are pivotally connected to a common tie bar 83. A spring 84 connects one crank 82 to the projection 85 on the extreme rear end of the carrier 12. Similarly, a spring 86 connects the other crank to the projection 85. When the carrier 12 swings about its pivot 13, one of the stop lugs is projected and the other is retracted. As shown in Figure 8, a stop lug 79 is projected to overlie an adjustable lug 87 mounted on the wheel arm 69. The stop element 80 is retracted. In order to provide an adjustment for the depth of the furrow, the lug 87 is made adjustable with respect to the wheel arm 69. As shown in Figure 10, the bracket 88 is fixed to the arm 69 by welding, and is provided with an inclined serrated surface 89. The lug 87 is also provided with a serrated surface 90. The surface 90 rests on the surface 89 in any one of a number of positions. The bolts 91, extending through slots 92 and apertures 93, serve to clamp the lug 87 in adjusted position. The upper surface 94 of the lug 87 engages one of the swinging stop lugs whenever the latter projects from its aperture. It will be understood that the adjustable stop lugs 87 on each of the wheel arms 69 and 70 are substantially duplicates.

The carrier 12 passes under the stationary cross plate 95 fixed at the forward end of the frame 14. At one end, this plate 95 is connected by means of pin 96 to the inclined rod 97. The rod 97 is also pivotally connected to crank arm 98 by means of pivot pin 99. The inclined rod 97 is made adjustable for length by threading one section of it into another section and then securing the sections by means of lock nuts 100. The crank arm 98 is fixed relative to the beam 20 on the frame 10. At the other end of the stationary cross plate 95, a pivot pin 101 connects a power cylinder assembly 102 to the plate 95. The piston rod 103 is pivotally connected at 104 to a boss 105 fixed on the carrier 12. From this description it will be understood that energizing the power cylinder assembly 102 in a direction to project the piston rod 103 serves to swing the carrier 12 in a counterclockwise direction, as viewed in Figure 1. Similarly, retraction of the piston rod 103 serves to swing the carrier 12 in a clockwise direction. It will also be observed that the inclined bar 97 serves to shift the position of the frame 10 in accordance with the angular position of the carrier 12 with respect to the wheeled carriage 15.

The arm 106, which forms a part of the crank 43ᵃ, is pivotally connected to a link 107 by means of pivot pin 108. This link 107 is pivotally adjustable in length. A pivot pin 109 connects the link to the stationary plate 95. From this description it will be understood that the arm 106 acts to shift the crank 43ᵃ and bar 46 in order to orient the plough disc 38 properly for producing either a right-hand furrow or a left-hand furrow.

If desired, a pair of castor wheels 110, 111 are mounted on brackets 112 and bolted to the side plates 21. These castor wheels assist in controlling the depth of cut of the plough discs, and they both roll on unploughed ground. The brackets 112 may be adjusted vertically with respect to the side plates 21 in order to regulate the depth of the furrow.

Hydraulic fluid for operating the various power cylinder assemblies is preferably supplied from the tractor through valve control means, as shown diagrammatically in Figure 14. The necessary conduits leading from the 4-way valve 114 to the power cylinders 71 and 22 are omitted from the other views of the drawings for clarity of illustration. It is desirable to have the power cylinder assembly 22 raise the forward end of the device before the power cylinder assemblies 71 raise the rearward end thereof, in order that the various furrows cut by the individual plough discs 38 end at substantially the same point in the field. Similarly, it is desirable to have the assembly 22 lower the forward end of the device in advance of the rearward end thereof for the same reason. Both of these desirable operating characteristics are achieved by means of the hydraulic system shown in Figure 14. When the operating handle 113 of the 4-way valve 114 on the tractor is turned to a position to pressurize the hydraulic line 115 and vent the hydraulic line 116, the piston rod of the assembly 22 is first extended. The build-up in pressure in the line 115 then allows hydraulic fluid to pass through the spring loaded check valve 117 and into the hydraulic line 118. The assemblies 71 are then presurized in a direction to project their respective piston rods. Exhaust fluid from all three power cylinder assemblies is vented through line 116.

When the operating handle 113 of the 4-way valve 114 is shifted to pressurize the line 116 and vent the line 115, the piston rods are all retracted, but assembly 22 operates in advance of the others because its diameter is selected in relation to the imposed load, so that gravity assists retraction of its piston rod to a greater extent than the other assemblies 71. Exhaust fluid from the assemblies 71 passes through line 118, check valve 119, and line 115.

In operation, the power cylinder assemblies 71 and 22 are extended to raise the carrier 12 and frame 10, and thus lift the plough discs 38 out of the ground. The power cylinder assembly 102 is then actuated to bring the carrier 12 and frame 10 to the "straight line" position shown in Figure 13. The device is then in position for highway travel to the field to be ploughed. When a ploughing location is reached, the power cylinder assembly 102 is actuated to swing the carrier 12 to either right-hand or left-hand position. Assuming that the carrier 12 is swung to the position shown in Figure 11, the power cylinders 71 and 22 are then deenergized to allow the plough assembly to rest on the ground. Forward motion of the tractor 30 then causes the discs 38 to produce left-hand furrows. The castor wheels 110 and 111 roll on unploughed ground. The forward end the carrier 12 is latched in position by means of the latch assembly 52. The angular position of the carrier 12 may be adjusted by shifting the position of the latches 52 and 53. The angle of the discs 38 may likewise be adjusted by shifting the position of the ends of the link 107, and the shifting of the discs may be made equal in both directions by adjusting the length of the link. Thus, the width of the cut may be varied to suit different types of soil. The wheel 67 rolls in the furrow, and the wheel 68 rolls on unploughed ground. The frame 14 of the wheeled carriage 15 remains substantially level because the swinging stop lug 79 engages the adjustable lug 87 on the wheel arm 69. The draft force is transmitted to the frame 10 through the beam 27 and parallel links 34.

When the end of the field is reached, the power cylinder assemblies 71 and 22 are energized to raise the plough discs 38 out of the ground. The assembly 22 first raises the forward end of the carrier, and the assemblies 71 then lift the rearward end thereof. The tractor 30 is turned around, and the power cylinder assembly 102 is actuated to swing the carrier 12 to the position shown in Figure 12. The assemblies 22 and 71 are then pressurized to cause the plough discs 38 to enter the ground. The foremost disc 38 enters the ground first because the forward end of the carrier descends more rapidly than the rearward end, as explained above.

Forward motion of the tractor 30 then causes the discs 38 to produce right-hand furrows. The wheel 68 rolls in the furrow while the wheel 67 rolls on unploughed ground. The castor wheels 110 and 111 continue to roll on unploughed ground behind the tractor. The frame 14 of the wheeled carriage 15 remains substantially level because the swinging stop lug 80 engages the adjustable lug 87 on the wheel arm 70. The latch assemblies 52 and 53 are preferably hydraulically connected with the power cylinder assembly 102, so that the carrier 12 remains in its selected position until the assembly 102 is actuated.

As shown in Figure 4, the beam 27 extends beyond its pivot 29, and is connected by means of pin 123 to the lower end of a tension bar 124. This tension bar extends between the side plates 21, and passes through aligned apertures provided in the beam 20. A nut 125 is threaded to the upper end of the bar, and may be held in place by means of a set screw 126. The nut may be screwed down on the bar 124 to the position shown in dotted lines in Figure 4 in order to hold the frame 10 at a high elevation for highway travel, and to relieve the pressure in the power cylinder assembly 22. Whenever it is required that the frame 10 remain elevated for a substantial period of time, the nut 125 may be employed and thereby relieve the pressure in the hydraulic lines leading to the assembly 22.

The castor wheels 110 and 111 assist in regulating the depth of cut, as described above, and also assist in providing lateral stability for the plough assembly at the time the plough discs 38 are being raised out of the ground. In some locations, and with some types of soil, this latter feature is not important and, therefore, the castor wheels may be omitted. In this case, the tension bar 124 becomes the means of regulating the depth of cut. The nut 125 may be adjusted to allow the frame 10 to reach only the desired minimum elevation. When the castor wheels are omitted, additional weight is imposed on the tractor 30. In some cases this is beneficial in order that the tractor may provide greater resistance to lateral thrust of the forward edge of the frame 10.

Having fully described my invention, it is to be understood that I am not to be limited to the details herein set forth, but that my invention is of the full scope of the appended claims.

I claim:

1. In a two way disc plough, the combination of: a carriage having side wheels adapted to roll alternately in a furrow, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, vertically movable means on the forward end of said second beam member for connection to a tractor, a plurality of ground engaging plough discs turnably mounted upon first said beam member, means for effecting relative swinging movement of said beam members between two operative positions, and means for turning the plough discs in response to such swinging movement to produce right-hand furrows in one of said operative positions and left-hand furrows in the other of said operative positions, one of the carriage wheels rolling in a right-hand furrow and the other in a left-hand furrow.

2. In a two way disc plough, the combination of: a carriage having side wheels adapted to roll alternately in a furrow, a first beam member pivotally connected to the carriage for horizontal swinging movement with respect to the direction of travel and extending forwardly from the carriage, a second beam member pivotally connected to the first beam member for horizontal swinging movement with respect to the direction of travel and extending forward therefrom, vertically movable means on the forward end of said second beam member for connection to a tractor, a plurality of ground engaging plough discs turnably mounted upon first said beam member, means on the carriage for swinging the first beam member between two operative positions, and means for turning the plough discs in response to such swinging movement to produce right-hand furrows in one of said operative positions and left-hand furrows in the other of said operative positions, one of the carriage wheels rolling in a right-hand furrow and the other in a left-hand furrow.

3. In a two way disc plough, the combination of: a carriage having wheel arms pivoted on opposite sides thereof, a ground wheel on the swinging end of each wheel arm, the ground wheels being adapted to roll alternately in a furrow, retractible stop lugs each adapted to engage an element on one of said wheel arms to minimize transverse tilt of the carriage when either wheel is in a furrow, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, vertically movable means on the forward end of said second beam member for connection to a tractor, a plurality of ground engaging plough discs turnably mounted upon one of the said members for producing right-hand or left-hand furrows, power means acting on the wheel arms for raising the carriage relative to its wheels and additional power means for raising the second beam member relative to the tractor, whereby the plough discs may be lifted clear of the ground, and means for effecting relative swinging movement of said beam members.

4. In a two way disc plough, the combination of: a carriage having wheel arms pivoted on opposite sides thereof, a ground wheel on the swinging end of each wheel arm, the ground wheels being adapted to roll alternately in a furrow, retractible stop lugs each adapted to engage an element on one of said wheel arms to minimize transverse tilt of the carriage when either wheel is in a furrow, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, vertically movable means on the forward end of said second beam member for connection to a tractor, a plurality of ground engaging plough discs turnably mounted upon said first beam member for producing right-hand or left-hand furrows, power means acting on the wheel arms for raising the carriage relative to its wheels and additional power means raising the second beam member relative to the tractor, whereby the plough discs may be lifted clear of the ground, and power means connected to the carriage for swinging said first beam member.

5. In a two way disc plough, the combination of: a carriage having side wheels mounted on pivoted wheel arms, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, a draft element for connection to a tractor, a plurality of ground engaging plough discs turnably mounted upon said first beam member, a lift element pivotally connected to the forward end of the second beam member and pivotally connected to said draft element for swinging movement in a vertical plane, first power means acting upon the wheel arms for raising the carriage relative to its wheels and additional power means for swinging the lift element relative to the second beam member whereby the plough discs may be lifted clear of the ground, and means interconnecting said first power means and said additional power means for dependent operation.

6. In a two way disc plough, the combination of: a carriage having side wheels mounted on pivoted wheel arms, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, a draft element for connection to a tractor, a plurality of ground engaging plough discs turnably mounted upon said first beam member, a lift element pivotally connected to the forward end of the second beam member and pivotally connected to said draft element for swinging movement in a vertical plane, a pair of power cylinder assemblies each acting upon one of the wheel arms for raising the carriage relative to its wheels, and a third power cylinder assembly for swinging the lift element relative to the second beam member whereby the plough discs may be lifted clear of the ground, and hydraulic means interconnecting said power cylinder assemblies for dependent operation.

7. In a two way disc plough, the combination of: a weighted carriage, the carriage having side wheels adapted to roll alternately in a furrow, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, means on the forward end of said second beam member for connection to a tractor, a plurality of ground engaging plough discs turnably mounted upon said first beam member and positioned on both sides of the pivotal connection between the beam members, and power means for raising the carriage relative to its wheels and additional power means for raising the second beam member relative to the tractor, whereby the plough discs may be lifted clear of the ground.

8. In a two way disc plough, the combination of: a weighted carriage, the carriage having side wheels adapted to roll alternately in a furrow, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, means on the forward end of said second beam member for connection to a tractor, a plurality of ground engaging plough discs turnably mounted upon said first beam member and positioned on both sides of the pivotal connection between the beam members, power means for raising the carriage relative to its wheels and additional power means for raising the second beam member relative to the tractor, whereby the plough discs may be lifted clear of the ground, means for swinging the first beam member between two operative positions, and linkage means for turning the plough discs in response to such swinging movement to produce right-hand furrows in one of said operative positions and left-hand furrows in the other of said operative positions.

9. In a two way disc plough, the combination of: a wheeled carriage, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, one of the beam members having a portion projecting beyond the pivotal connection between the beam members, an arcuate element fixed on said projecting portion, means on the forward end of said second beam member for connection to a tractor, a plurality of ground engaging plough discs turnably mounted upon one of the said members, power means for raising the carriage relative to its wheels and additional power means for raising the second beam member relative to the tractor, whereby the plough discs may be lifted clear of the ground, means for effecting relative swinging movement of said beam members between two operative positions, linkage means for turning the plough discs in response to such swinging movement to produce right-hand furrows in one of said operative positions and left-hand furrows in the other of said operative positions, and releasable latch means on said arcuate element for latching the beam members in either of said operative positions.

10. In a two way disc plough, the combination of: a wheeled carriage, a first beam member pivotally connected to the carriage for horizontal swinging movement with respect to the direction of travel and extending forward from the carriage, a second beam member pivotally connected to the first beam member for horizontal swinging movement with respect to the direction of travel and extending forward therefrom, one of the beam members having a portion projecting beyond the pivotal connection between the beam members, an arcuate element fixed on said projecting portion, means on the forward end of said second beam member for connection to a tractor, a plurality of ground engaging plough discs turnably mounted upon the first beam member, power means for raising the carriage relative to its wheels and additional power means for raising the second beam member relative to the tractor, whereby the plough discs may be lifted clear of the ground, power means for swinging said beam members between two operative positions, linkage means for turning the plough discs in response to such swinging movement to produce right-hand furrows in one of said operative positions and left-hand furrows in the other of said operative positions, and releasable latch means on said arcuate element for latching the beam members in either of said operative positions.

11. In a two-way disc plough, the combination of: a rear carriage having laterally spaced wheels mounted for vertical movement thereon, a first beam pivotally connected to the carriage for horizontal swinging movement with respect to the direction of travel and extending forwardly therefrom, a second beam pivotally connected to the first beam between the ends thereof for horizontal swinging movement with respect to the direction of travel, the second beam extending forwardly of the forward end of the first beam, vertically movable means on said second beam near the forward end thereof for connection to a tractor, a plurality of ground engaging plough discs each turnably mounted upon said first beam, power means for raising the rear carriage relative to its wheels and for raising the second beam relative to the tractor, whereby the plough discs may be lifted clear of the ground.

12. In a two way disc plough, the combination of: a rear carriage having laterally spaced wheels mounted for vertical movement thereon, a first beam pivotally connected to the carriage for horizontal swinging movement with respect to the direction of travel and extending forwardly therefrom, a second beam pivotally connected to the first beam between the ends thereof for horizontal swinging movement with respect to the direction of travel, the second beam extending forwardly of the forward end of the first beam, vertically movable means on said second beam near the forward end thereof for connection to a tractor, a plurality of ground engaging plough discs each turnably mounted upon said first beam, power means for raising the rear carriage relative to its wheels and for raising the second beam relative to the tractor, whereby the plough discs may be lifted clear of the ground, means for effecting relative swinging movement of said beams between two operative positions, and means for turning the plough discs in response to such swinging movement to produce right-hand furrows in one of said operative positions and left-hand furrows in the other of said operative positions.

13. In a two way disc plough, the combination of: a rear carriage having laterally spaced wheels mounted for vertical movement thereon, a first beam pivotally connected to the carriage for horizontal swinging movement with respect to the direction of travel and extending forwardly therefrom, a second beam pivotally connected to the first beam between the ends thereof for horizontal swinging movement with respect to the direction of travel, the second beam extending forwardly of the forward end of the first beam, vertically movable means on said second beam near the forward end thereof for connection to a tractor, a plurality of ground engaging plough discs each turnably mounted upon said first beam, laterally spaced castor wheels mounted upon the second beam and adapted to roll upon unploughed ground, power means for raising the rear carriage relative to its wheels and for raising the second beam relative to the tractor, whereby the plough discs and castor wheels may be lifted clear of the ground, means for effecting relative swinging movement of said beams between two operative positions, and means for turning the plough discs in response to such swinging movement to produce right-hand furrows in one of said operative positions and left-hand furrows in the other of said operative positions.

References Cited in the file of this patent

UNITED STATES PATENTS

| | | | |
|---|---|---|---|
| 954,950 | Fowler | Apr. 12, | 1910 |
| 1,615,630 | Kaupke | Jan. 25, | 1927 |
| 1,740,841 | Smith | Dec. 24, | 1929 |
| 1,757,956 | Flatley et al. | May 13, | 1930 |
| 2,153,824 | Collins | Apr. 11, | 1939 |
| 2,163,832 | Coviello | June 27, | 1939 |
| 2,202,348 | Leach | May 28, | 1940 |
| 2,303,320 | Benjamin | Dec. 1, | 1942 |
| 2,314,041 | Gurries | Mar. 16, | 1943 |
| 2,546,554 | McElroy | Mar. 27, | 1951 |
| 2,595,277 | Mathias | May 6, | 1952 |
| 2,600,359 | Coviello | June 10, | 1952 |
| 2,628,126 | Black | Feb. 10, | 1953 |
| 2,648,267 | Pursche | Aug. 11, | 1953 |
| 2,675,749 | Pursche | Apr. 20, | 1954 |

FOREIGN PATENTS

| | | | |
|---|---|---|---|
| 2,190 | Great Britain | | 1875 |
| 645,301 | Great Britain | Oct. 25, | 1950 |
| 5,965/27 | Australia | Feb. 14, | 1927 |
| 254,469 | Switzerland | May 15, | 1948 |